United States Patent [19]
Horner-Richardson et al.

[11] Patent Number: 5,492,570
[45] Date of Patent: Feb. 20, 1996

[54] HYBRID THERMAL ELECTRIC GENERATOR

[75] Inventors: Kevin Horner-Richardson; William G. Anderson, both of Lancaster, Pa.

[73] Assignee: Thermacore, Inc., Lancaster, Pa.

[21] Appl. No.: 270,690

[22] Filed: Jul. 5, 1994

[51] Int. Cl.⁶ .................................................. H01L 37/00
[52] U.S. Cl. .................... 136/200; 136/202; 136/205; 310/306; 376/321; 429/5; 429/11; 429/112; 429/120
[58] Field of Search .................. 136/200, 202, 136/205, 208, 209, 210; 429/5, 11, 112, 120; 310/306; 376/321

[56] References Cited

U.S. PATENT DOCUMENTS

| | | | |
|---|---|---|---|
| 3,189,765 | 6/1965 | Danko et al. | 310/4 |
| 3,400,015 | 9/1968 | Chapman | 117/224 |
| 3,437,847 | 4/1969 | Raspet | 310/4 |
| 4,042,757 | 8/1977 | Jones | 429/104 |
| 4,220,692 | 9/1980 | Hunt | 429/14 |
| 4,280,074 | 7/1981 | Bell | 310/306 |
| 4,368,416 | 1/1983 | James | 322/2 R |
| 4,755,350 | 7/1988 | Kennel | 376/321 |
| 4,820,596 | 4/1989 | Williams et al. | 429/50 |
| 4,835,071 | 5/1989 | Williams et al. | 429/11 |
| 4,857,421 | 8/1989 | Ernst | 429/104 |
| 4,871,626 | 10/1989 | Williams | 429/11 |

Primary Examiner—Donald P. Walsh
Assistant Examiner—Chrisman D. Carroll
Attorney, Agent, or Firm—Martin Fruitman

[57] ABSTRACT

The apparatus is a combined Alkali Metal Thermal to Electric Converter (AMTEC) and a thermionic energy converter which are mated by the use of a common heat transfer device which can be a heat pipe, pumped fluid or a simple heat conduction path. By adjusting the heat output surface area of the thermionic converter and the heat input surface area of the AMTEC, the heat transfer device accomplishes not only the transfer of heat from the output of the thermionic converter to the input of the AMTEC, but also the transformation of the heat density to match the requirements of the AMTEC input. The electrical current through the combined devices is also matched by adjusting the heated surface area of the AMTEC.

6 Claims, 4 Drawing Sheets

HYBRID THERMAL ELECTRIC GENERATOR

BACKGROUND OF THE INVENTION

This invention deals generally with electrical current production by means of a temperature differential between electrodes and more specifically with such a device which combines a thermionic energy converter and an alkali metal thermal to electric converter to increase the electrical power available from a single source of heat.

Both thermionic energy converters and alkali metal thermal to electric converters are well understood in the art and their principles of operation need not be described here in great detail.

An alkali metal thermal to electric converter (AMTEC) moves liquid alkali metal ions through a catonic barrier while blocking the electrons of the alkali metal atoms. It is this separation of the electrons from the atoms which produces an electrical voltage. The movement of the liquid alkali metal can be accomplished by an electromagnetic pump or even with no moving parts because the liquid alkali metal can be moved by means of capillary pumping action. Such AMTEC devices typically operate with input temperatures of 1000 to 1100 degrees K, output temperatures of 600 degrees K, and heat flux inputs of 1 to 2 watts per square centimeter. They produce electricity of low voltage and high current. A typical cell can produce 0.4 volts at 300 to 500 amperes at a conversion efficiency, the ratio of thermal power in to the electrical power out, of about 19 percent.

A thermionic energy converter generates electricity from heat by using a sealed vacuum enclosure which includes a collector surface which is cooled and is separated from a heated emitter by an interelectrode space. The emitter is heated to a high temperature which results in electron emission, and the electrons move to the cooler collector, thus generating an electrical voltage between the emitter and the collector. Typical conditions under which such thermionic energy converters operate are input temperatures of 1900–2000 degrees K and output temperatures of 1000 degree K with a heat flux input of 10–20 watts per square centimeter. A typical thermionic energy converter can produce 0.7 volts at 300–500 amperes at a conversion efficiency of about 10 percent.

It is the order of magnitude difference between the operating heat fluxes of these two devices which have, up until now, made their association impossible. Heat flux is the measurement of the concentration of thermal power, that is, the amount of heat flowing through a standard surface area. For the units being used here the standard area is one square centimeter of surface. While the thermionic energy converter input and output heat flux is typically 10 to 20 watts per square centimeter, the heat flux required for an AMTEC input is typically only 1 to 2 watts per square centimeter.

Attempting to directly use the heat leaving the thermionic converter to power an AMTEC would compare, in the common world of thermal experience, to attempting to cook an egg by the direct application of a gas welding torch or even the direct application of a stove burner to the egg. We commonly use a pan to spread the heat and reduce the heat flux applied to the egg. Similarly, while the total heat power and the temperature on the output of a thermionic energy converter might be proper for an AMTEC, the concentration of heat, the thermal flux, of a typical AMTEC cell might require the thermionic energy converter to operate at less than optimum conditions.

SUMMARY OF THE INVENTION

The invention is an Alkali Metal Thermal to Electric Converter (AMTEC) cell combined with a thermionic converter cell to sum the voltages available and to yield a substantially higher conversion efficiency. When an AMTEC is operated from the waste heat leaving a thermionic energy converter, no additional heat need be added to the system, but increased power is derived from the combined cells.

The AMTEC and the thermionic energy converter are mated by the use of a heat transfer device which can be a heat pipe, a pumped fluid or a simple heat conduction path. By adjusting the heat output surface area of the thermionic converter and the heat input surface area of the AMTEC, the heat transfer device accomplishes not only the necessary transfer of heat from the output of the thermionic converter to the input of the AMTEC, but also the transformation of the heat flux to match the requirements of the AMTEC cell input. The electrical output is derived by connecting the two devices in a series electrical circuit to yield a total voltage which is the sum of the voltages available from each of the cells. The electrical current through the combined devices is also equalized by adjusting the size of the heated surface area of the AMTEC.

The preferred embodiment of the invention accomplishes the transformation of heat flux by the use of a heat pipe. The operation of a heat pipe is also well understood in the art. The heat pipe has a sealed, enclosed volume from which all noncondensible gases have been evacuated and into which is placed a vaporizable liquid. When a surface in contact with the liquid is heated, the liquid vaporizes and then condenses on a the cooler surface within the heat pipe. Usually the heat pipe includes a wick or capillary grooves which then moves the condensed liquid back to the heated surface. The heat required for the vaporization of the liquid and the heat the vapor gives up as it condenses effectively move heat from the heated surface to the cooler surface with no change of temperature, only a change of state. This accomplishes a very effective transfer of heat between the heated and cooled surfaces, usually located at remote ends of a cylinder, with virtually no temperature differential between the surfaces.

When, as in the preferred embodiment of the invention, a heat pipe is used to transfer heat from the output of a thermionic converter to the input of an AMTEC, the heat pipe can also adjust the power density between the two devices. All that is required for such a transformation is that the ratio of surface area of the heated evaporator surface of the heat pipe to the surface area of the cooled condenser surface be inversely proportional to the desired transformation of power density.

Thus, if the thermionic converter output power density is, as usual, ten times as great as the input power density required for an associated AMTEC, then the evaporator surface area of the interconnecting heat pipe which is attached to the thermionic converter output, must be one-tenth the surface area of the condensing area of the heat pipe which is attached to the input of the AMTEC. Then, as long as the higher power density is within the design capability of the heat pipe, heat will be transferred between the devices with virtually no loss of temperature, and the power density of the AMTEC input will be reduced to a level appropriate for efficient operation.

Perhaps the simplest device for interconnecting a thermionic converter to an AMTEC is a simple conical shaped metal heat conductor. When the apex of such a structure is attached to the thermionic converter output and the much larger base is attached to the input of an AMTEC, the power densities also vary inversely as the areas of attachment. However, unlike the heat pipe, a metal conduction path will cause a substantial temperature drop, and that temperature drop will decrease the conversion efficiency of the combined thermionic converter and AMTEC. Nevertheless, even with such reduced efficiency, the output power and the conversion efficiency of the combined devices will be greater than either one alone.

DETAILED DESCRIPTION OF THE INVENTION

Figure 1:
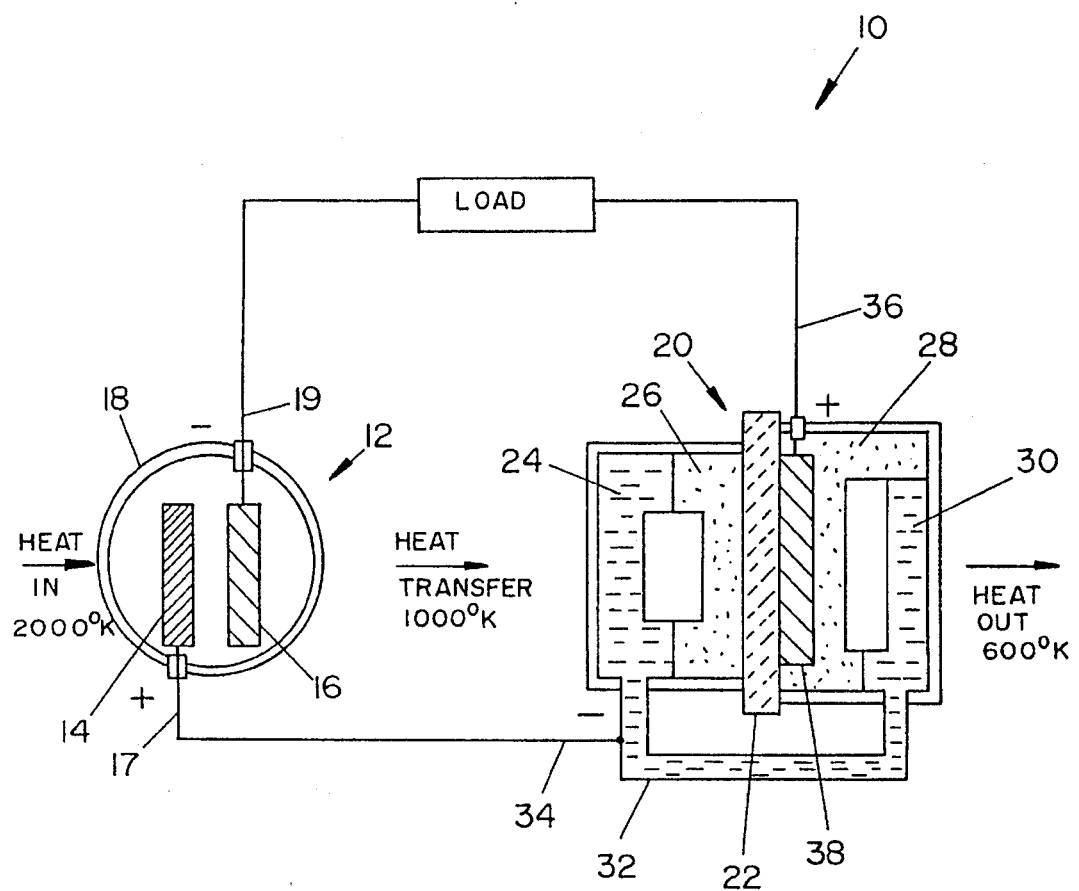
FIG. 1 is a simplified schematic diagram of the invention.

FIG. 1 is a simplified schematic diagram of generator 10 which uses the invention in which thermionic energy converter 12 is shown in a very simple form as emitter plate 14 and collector plate 16 separated and enclosed within vacuum enclosure 18. Thermionic energy converter 12 is electrically and thermally interconnected to alkali metal thermal to electric converter (AMTEC) 20.

Thermionic energy converter 12 generates electrical power from heat because the heat input at the high temperature of 2000 degrees K causes emitter 14 within the vacuum to emit electrons which migrate to cooler collector 16. The excess of electrons on collector 16 creates a voltage between emitter 14 and collector 16 which is available outside vacuum enclosure 18 at connectors 17 and 19.

AMTEC 20 also creates a voltage because it moves sodium ions through beta double prime alumina catonic barrier 22 while preventing the electrons from the sodium atoms from moving through catonic barrier 22. This leaves an excess of electrons on one side of catonic barrier 22 and thus creates a voltage across catonic barrier 22. The movement of the sodium is accomplished by using the input heat to vaporize liquid sodium 24 and produce sodium vapor 26 from which only the ions migrate through catonic barrier 22. On the other side of catonic barrier 22, sodium vapor 28 condenses into sodium liquid 30 which is pumped back to the heated side of AMTEC 20 through pipe 32. It is the separation of the electrons from the atoms which produces an electrical voltage between connectors 34 connected to the liquid sodium and connector 36 which is connected to the positive side of catonic barrier 22 by means of porous metal electrode 38.

The movement of the liquid sodium through pipe 32 can be accomplished by an electromagnetic pump or by means of the capillary pumping action of a wick which can be placed within pipe 32. The movement of the sodium vapor ions through catonic barrier 22 is driven by the difference in vapor pressures between the heated side of AMTEC 20 where the vapor pressure is higher than on the cooler side where the the vapor is condensing into liquid.

While the typical output temperature of 1000 degrees K of thermionic energy converter 12 is fortuitously quite satisfactory for the input temperature of AMTEC 20, there are other criteria for the heat transfer which do not match so neatly. One is the power density requirements of the two devices. Thermionic energy converters such as converter 12 typically give off their waste heat at power densities of 10–20 watts per square centimeter, while AMTEC devices such as AMTEC 20 tolerate power inputs of only 1–2 watts per square centimeter. It is this difference which prevents simply butting the input of AMTEC 20 up against the output of the thermionic energy converter 12.

Figure 2:
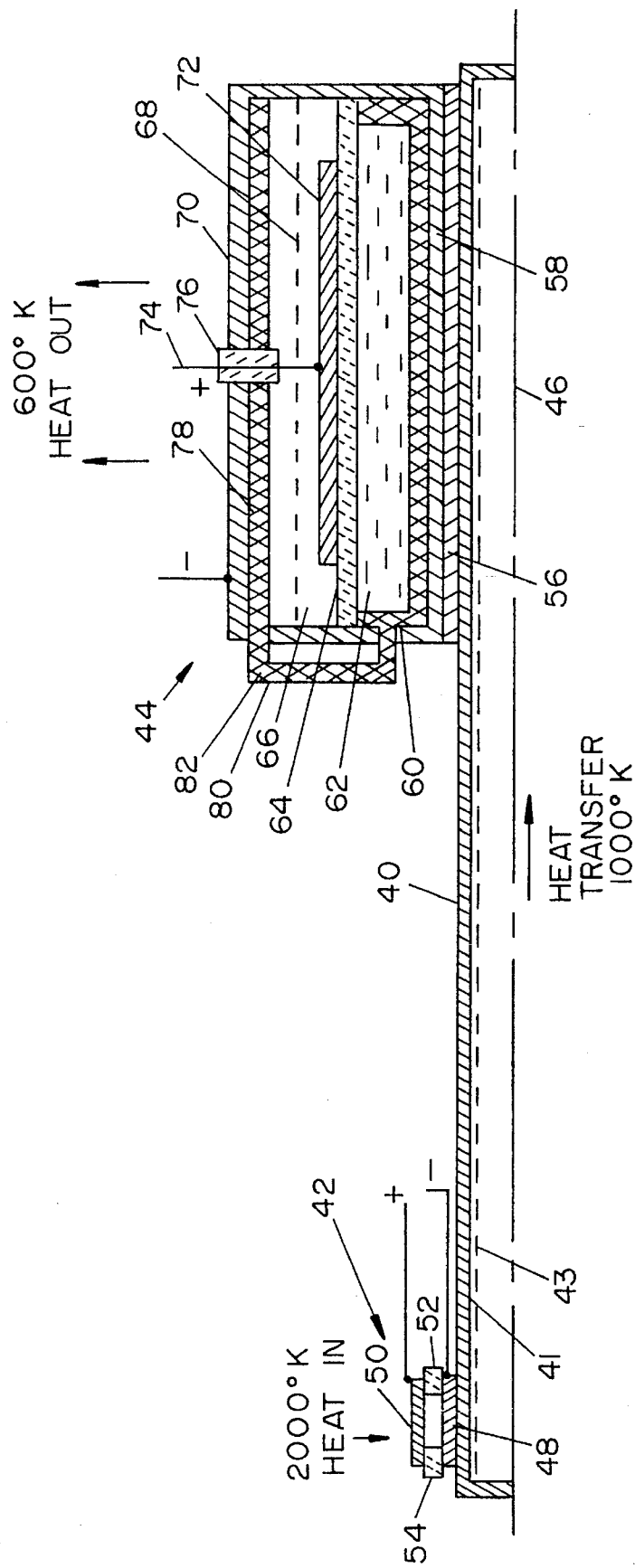
FIG. 2 is a cross section view of the preferred embodiment of the invention in which a heat pipe is used to transfer heat between a thermionic converter and an AMTEC.

FIG. 2 is a cross section view of the preferred embodiment of the invention in which heat pipe 40 is used to transfer heat and also transform the power density of the heat transferred between thermionic energy converter 42 and AMTEC 44. FIG. 2 depicts only the structure on one side of centerline 46, since the structure is essentially cylindrical and would be duplicated below centerline 46.

Thermionic converter 42 is constructed of collector ring 48, which is attached to heat pipe 40, and emitter ring 50 which is separated from collector ring 48 by insulator rings 52 and 54, which also complete the vacuum enclosure of thermionic energy converter 42.

AMTEC 44 is also constructed around heat pipe 40, but is separated from it by thermal conductor and electrical insulator sleeve 56. Electrical insulation is required between the thermionic converter and the AMTEC because of the polarities of their electrical connections. Since both the heat output from electrically negative collector 48 of thermionic converter 42 and the heat input to electrically negative casing 58 of AMTEC 44 must be thermally conductive to metal heat pipe casing 41, in order to connect the cells in series the electrical insulation must be provided somewhere between the AMTEC and the thermionic converter. Such an electrical insulator and thermal conductor as sleeve 56 can be constructed of beryllium oxide.

Within casing 58 of AMTEC 44, evaporator wick 60 is adjacent to casing 58 and is in contact with liquid sodium 62. Beta double prime alumina catonic barrier 64 separates liquid sodium 62 from vapor region 66 which also includes heat shield 68 to aid in condensation of sodium vapor onto cooler wall 70.

Porous electrode 72 is also located within vapor region 66 and is in electrical contact with catonic barrier 64 so that the electrical voltage on catonic barrier 64 can be conducted outside of casing 58 by electrical connector 74 through electrical insulator 76 and form the positive connector of AMTEC 44.

Condenser wick 78 is located within vapor region 66 and in contact with cooler wall 70 so that, as sodium condenses on wall 70, wick 78 pumps the liquid sodium by capillary action to pipe 80. Pipe 80, which includes internal capillary wick 82 pumps the liquid sodium back to evaporator wick 60 by capillary action, so that the liquid sodium can be evaporated again.

Heat pipe 40 is the means to both transfer the heat from thermionic energy converter 42 to AMTEC 44 and to reduce the power density by a factor of ten. As with any heat pipe, heat pipe 40 has a very simple construction. It is essentially only a heat conductive, sealed enclosure from which all noncondensible gases have been evacuated and into which is placed a capillary wick and a limited amount of vaporizable liquid. Heat pipe 40 is constructed with cylindrical sealed casing 41 and with wick 43 adjacent to casing 41. A typical vaporizable material for use in the preferred embodiment pictured in FIG. 2 would be liquid sodium.

The operation of heat pipe 40 is then quite conventional. As the heat from thermionic energy converter 42 passes through heat pipe casing 41 it heats the liquid sodium, and because the of the absence of any gas pressure within heat pipe 40, the sodium is vaporized. The sodium vapor then moves to the cooler surfaces of casing 41 which are located adjacent to AMTEC 44 because the vapor pressure there is lower. At the cooler end of heat pipe 40 the vapor condenses giving up the heat that it removed from the hotter end of heat pipe 40 during the process of vaporization. The liquid condensate is then moved back to the heated end of heat pipe 40 by the capillary pumping action of wick 43 and the process continues.

The important characteristic of this heat transfer is that it is driven by the heats of vaporization and condensation and that it therefore occurs with essentially no temperature change. This gives heat pipes their unique characteristic of having essentially the same temperature throughout their entire length, regardless of how long that length is. Moreover, for purposes of this invention it permits the same temperature to be available for output over a much greater surface area than the surface area through which it entered the heat pipe.

FIG. 2 Therefore pictures AMTEC 44 as having a contact surface with heat pipe 40 which is approximately ten times larger than the surface area of thermionic energy converter 42. With such dimensions, the heat energy entering heat pipe 40 at a power density of, for instance, 20 watts per square centimeter would be transferred to AMTEC 44 through ten times as much area and therefore be at a power density of two watts per square centimeter. In this regard it is important to note that if the end of heat pipe 40 in contact with AMTEC 44 were of a greater diameter than the heated end of the heat pipe, it would still operate in the same manner, and some of the increase in surface area could be attained by the increase in surface area from the increased radius of heat pipe 40.

Figure 3:
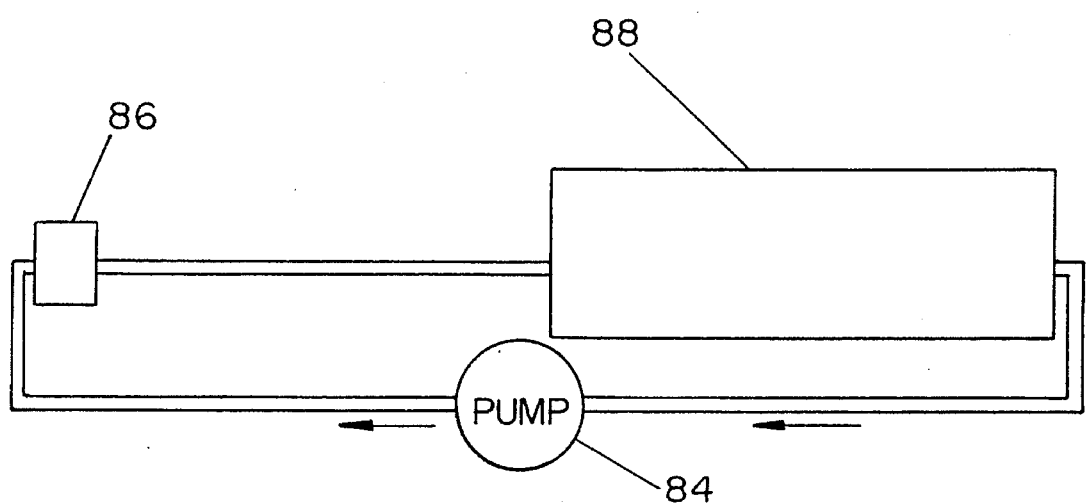
FIG. 3 is a simplified block diagram of an alternate embodiment of the invention in which a pumped liquid is used to transfer heat between a thermionic converter and an AMTEC.

FIG. 3 is a simplified block diagram of an alternate embodiment of the invention in which a pumped liquid is moved by pump 84 and is used to transfer heat between thermionic energy converter 86 and AMTEC 88. Of course, to operate at the required temperature of approximately 1000 degrees K, a unique liquid, such as liquid sodium, would have to be used and pump 84 would also have to be capable of moving such a liquid. One type of pump which operates satisfactorily for such purposes is an electromagnetic pump.

As in the embodiment shown in FIG. 2, the conversion to a lower power density is accomplished by using a ratio of the heat input surface area of the AMTEC to the heat output surface area of the thermionic energy converter which is the inverse of the transformation required for the power densities. However, a pumped liquid does not supply the same benefit of heat transfer without temperature change as does the heat pipe of FIG. 2.

Figure 4:
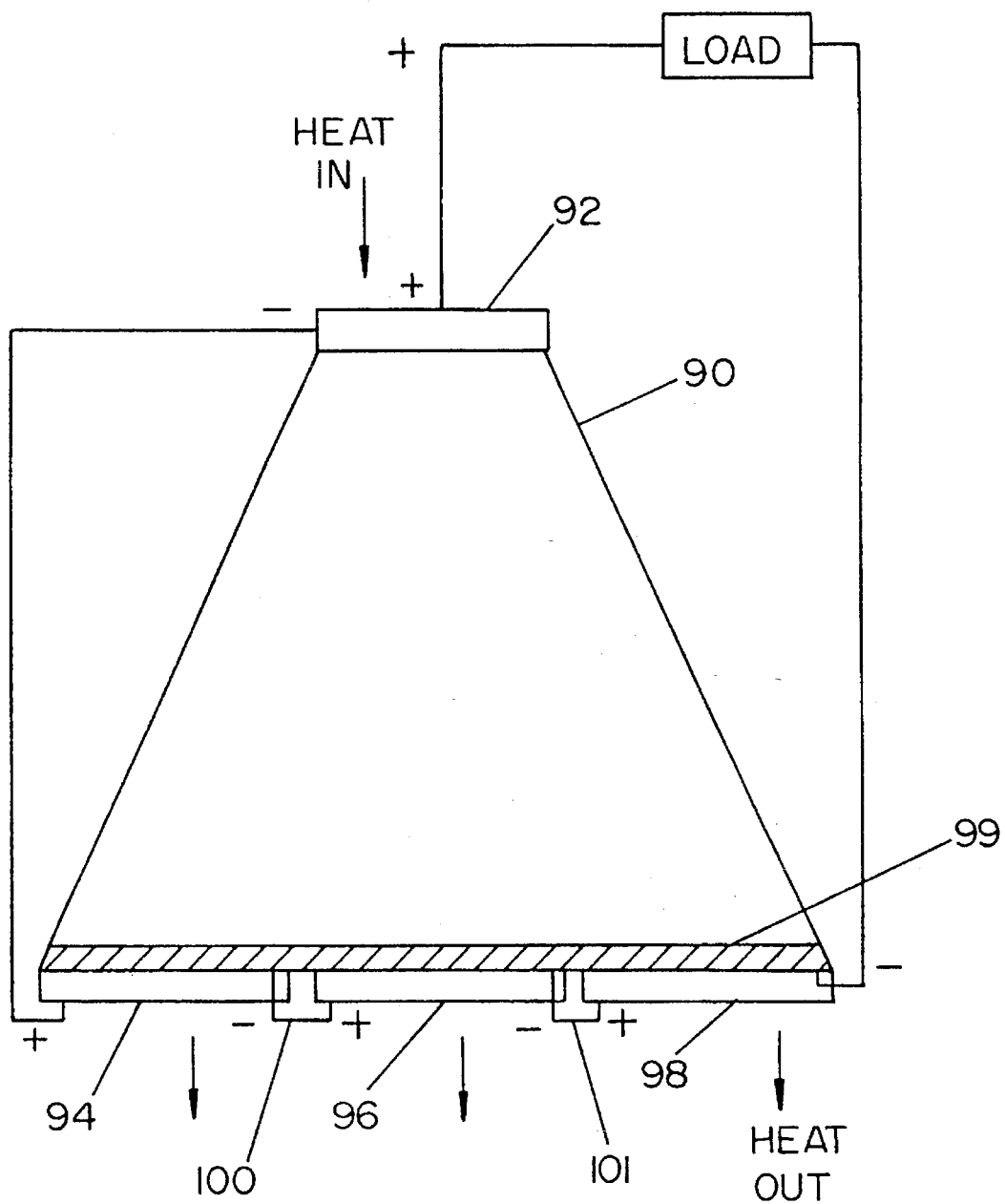
FIG. 4 is a simplified block diagram of an alternate embodiment of the invention in which a metal conductor is used to transfer heat between a thermionic converter and an AMTEC.

FIG. 4 is a simplified block diagram of another alternate embodiment of the invention in which a simple thermal conductor is used to transfer heat and to transform the power density. Thermal conductor 90, which could be something as simple as a truncated cone of metal, conducts heat from the output of planar thermionic converter 92 to the input of planar AMTEC devices 94, 96, and 98. As with the embodiment of FIG. 3, there is a loss of temperature with a solid metal thermal conductor, but the configuration of a truncated cone yields a benefit in attaining large changes of power density because the surface area of the base of the cone increases by the square of its diameter. It should be appreciated that such a truncated cone configuration could also be used as the configuration of a heat pipe.

FIG. 4 also depicts a means for adjusting another characteristic of the hybrid thermal generator of the invention. Since the currents available from both thermionic energy converters and AMTEC devices are a function of the heated surface area of the particular device, and a necessary requirement for electrically connecting a thermionic energy converter and an AMTEC in series is that they both develop the same current, it may be necessary to match not only the power densities of the devices but also the total surface area.

A configuration for combining a thermionic energy converter and AMTECs that can adjust both these parameters is shown in FIG. 4. As previously discussed, the ratio of the AMTEC heat input surface to the thermionic energy converter output surface is the basis for adjusting the power densities. To match the current capabilities of the devices it is then necessary to divide the heated AMTEC surface into several individual cells, each of which generates the same current as the thermionic energy converter. These individual cells, shown in FIG. 4 as cells 94, 96 and 98, can then be connected electrically in series by connections 100 and 101 to yield the same power as a single cell, but at a lower current and a higher voltage.

As previously described in regard to FIG. 2 the series electrical connection of the electrical cells, including the series connection of cells 94, 96, and 98 requires that they be electrically insulated from thermal conductor 90 which is an electrical conductor, whether it is a simple metal cone or a conical shaped heat pipe. This electrical insulation is provided by wafer 99 of electrically insulating and thermally conducting material, which typically is beryllium oxide.

In one arrangement using the heat pipe configuration of FIG. 2, but with three individual AMTEC cells in place of the single cell pictured, the following results can be attained. With a thermionic energy converter heat input of 2280 watts at a temperature of 1925 degrees K, heat transferred to three AMTEC cells at 1000 degrees K, and heat leaving the combined units at 600 degree K, the total electrical output is 327 amperes at 1.9 volts at a conversion efficiency of 27 percent. In this arrangement three AMTEC cells are connected in series, and each one generates 0.4 volts at 327 amperes with an electrical current density of 0.5 amps per square centimeter, while the thermionic energy converter generates 0.7 volts at 327 amperes.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example, the thermionic energy converter, the AMTEC, and the heat transfer device all may be constructed in various configurations, including cylindrical, planar or toroidal structures.

What is claimed as new and for which Letters Patent of the United States are desired to be secured is:

1. An electrical generator combining a thermionic energy converter and an alkali metal thermal to electric converter comprising:

a thermionic energy converter with a heat input surface, a heat output surface, and first electrical connectors from which the thermionic energy converter furnishes electrical power at a first voltage and a first current when heat is applied to its heat input surface and removed from its heat output surface at a first thermal power density;

an alkali metal thermal to electric converter with a heat input surface, a heat output surface, and second electrical connectors from which the alkali metal thermal to electric converter furnishes electrical power at a second voltage and a second current when heat is applied to its heat input surface at a second thermal power density and removed from its heat output surface;

a heat transfer apparatus thermally connected to the thermionic energy converter's heat output surface at a first heat transfer surface and to the alkali metal thermal to electric converter's heat input surface at a second heat transfer surface, and transferring heat from the thermionic energy converter's heat output surface to the alkali metal thermal to electric converter's heat input surface, with the second heat transfer surface being larger than the first heat transfer surface and the ratio of the area of the first heat transfer surface to the area of the second heat transfer surface being the inverse of the ratio of the first thermal power density to the second thermal power density; and a first electrical connector of the thermionic energy converter electrically connected in series with a second electrical connector of the alkali metal thermal to electric converter, and the thermionic energy converter's first current being equal to the alkali metal thermal to electric converter's second current.

2. The electrical generator of claim 1 wherein the heat transfer apparatus is a heat pipe.

3. The electrical generator of claim 1 wherein the heat transfer apparatus is a pumped liquid heat exchanger.

4. The electrical generator of claim 1 wherein the heat transfer apparatus is a configuration of solid heat conductive material.

5. The electrical generator of claim 1 further including an electrical insulator between the thermionic energy converter and the alkali metal thermal to electric converter which is thermally conductive and electrically insulating.

6. The electrical generator of claim 1 wherein the alkali metal thermal to electric converter is divided into at least two cells electrically connected to optimize the second thermal power density and adjust the second current to be equal to the first current.

\* \* \* \* \*